No. 725,706. PATENTED APR. 21, 1903.
J. E. HILL.
FISH TRAP.
APPLICATION FILED JAN. 23, 1903.
NO MODEL.

Witnesses:
Fred S. Grunbach.
W. C. Lunsford.

Inventor.
John E. Hill,
By Crosby & Gregory
Attys.

UNITED STATES PATENT OFFICE.

JOHN E. HILL, OF CENTER HARBOR, NEW HAMPSHIRE.

FISH-TRAP.

SPECIFICATION forming part of Letters Patent No. 725,706, dated April 21, 1903.

Application filed January 23, 1903. Serial No. 140,297. (No model.)

*To all whom it may concern:*

Be it known that I, JOHN E. HILL, a citizen of the United States, residing at Center Harbor, county of Belknap, State of New Hampshire, have invented an Improvement in Fish-Traps, of which the following description, in connection with the accompanying drawings, is a specification, like letters on the drawings representing like parts.

This invention has for its object the production of a novel fish-trap. The body of the trap, composed of any usual material, and preferably wire-cloth, has at its ends suitable rings with relation to which the contracted or funnel-shaped entrance to the trap is secured. One or both of these funnel-shaped entrances will be suitably pivoted on the end of the body of the trap, and means have been provided for locking the entrances when the trap is set. Pivoting the funnel-shaped entrances provides for shifting the same to enable bait of some sort to be put into the trap and also to enable the fish to be readily removed from the trap. I prefer to use a transparent substance, such as glass, as the material for the funnel-shaped entrance.

Figure 1:
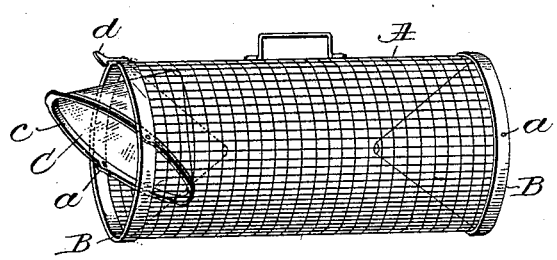
Figure 2:
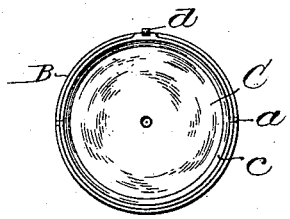
Figure 3:
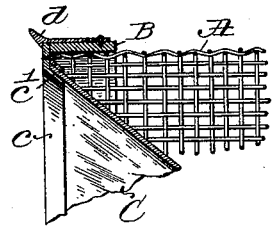

Figure 1, in side elevation, shows a trap embodying my invention, one of the funnel-shaped ends occupying its abnormal or open or unlocked position. Fig. 2 is an end view thereof with the funnel-shaped end in its normal position or closed. Fig. 3 is a section chiefly to show one way of holding the funnel-shaped entrance, if of glass, in the ring.

The body A of the trap, preferably cylindrical in shape, will preferably be of wire. The end of the wire cylinder has applied to it and secured thereto a suitable ring or frame B. These rings sustain by suitable pivots $a$ a funnel-shaped entrance C. The large end of each funnel is laid into a ring $c$, having holes to embrace the pivots, and a holding-ring $c'$ (see Fig. 3) may be then inserted to confine the glass entrance in place in the ring. I have, therefore, a locking device (shown as a spring $d$) sustained by the ring B, shaped to engage and hold the funnel-shaped entrance closed, as shown by dotted lines, when the trap is in use; but the entrance may be tipped, as represented by full lines, when the trap is to be supplied with bait or when fish are to be removed from the trap.

Having described my invention, what I claim as new, and desire to secure by Letters Patent, is—

1. A fish-trap comprising a body having pivoted entrances, composed of glass, the glass being held in a ring.

2. A fish-trap comprising a body having a pivoted transparent funnel-shaped entrance, and a locking device to hold said entrance closed.

3. A fish-trap comprising a body having a transparent funnel-shaped entrance pivoted diametrically within the mouth of the trap.

In testimony whereof I have signed my name to this specification in the presence of two subscribing witnesses.

JOHN E. HILL.

Witnesses:
 A. A. BENNETT,
 M. H. FLETCHER.